US012400537B2

(12) United States Patent
Laurans et al.

(10) Patent No.: US 12,400,537 B2
(45) **Date of Patent: *Aug. 26, 2025**

(54) ALARM SYSTEM WITH FIRST RESPONDER CODE FOR BUILDING ACCESS

(71) Applicant: SimpliSafe, Inc., Boston, MA (US)

(72) Inventors: Charles Laurans, Brookline, MA (US); Rahul Subramany, Waltham, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/579,637

(22) Filed: Jan. 20, 2022

(65) Prior Publication Data

US 2022/0148413 A1 May 12, 2022

Related U.S. Application Data

(63) Continuation of application No. 16/876,485, filed on May 18, 2020, now Pat. No. 11,263,892, which is a (Continued)

(51) Int. Cl.
*G08B 25/00* (2006.01)
*E05B 45/06* (2006.01)
(Continued)

(52) U.S. Cl.
CPC ............ *G08B 25/008* (2013.01); *E05B 45/06* (2013.01); *G07C 9/33* (2020.01); *G07C 9/38* (2020.01);

(Continued)

(58) Field of Classification Search
CPC ........ G08B 25/008; G08B 25/12; G07C 9/38; G07C 9/33; E05B 45/06; E05B 2045/069; E05B 2045/0695

(Continued)

(56) References Cited

U.S. PATENT DOCUMENTS 3,397,905 A 8/1968 Banse
4,367,458 A 1/1983 Hackett
(Continued)

FOREIGN PATENT DOCUMENTS

AU 2011224106 A1 4/2012
CN 104213759 A 12/2014
(Continued)

OTHER PUBLICATIONS

International Search Report and Written Opinion for International Application No. PCT/US2020/015554, mailed Jun. 26, 2020.

(Continued)

*Primary Examiner* — Brian A Zimmerman
*Assistant Examiner* — Thang D Tran
(74) *Attorney, Agent, or Firm* — Finch & Maloney PLLC

(57) ABSTRACT

A building alarm system and automated door lock arranged to place the alarm system in an armed state when a door lock fails to engage to lock an associated door in a closed position. Activation of a single button by a user or use of specific code by a user to gain access to a building can cause the alarm system to automatically rearm and for door locks at the building to be locked after entry by the user. A first responder code can be used by first responder personnel to gain access to a building after an alarm system indicates an alarm state, e.g., that corresponds to an emergency condition.

19 Claims, 1 Drawing Sheet

Related U.S. Application Data continuation of application No. 16/264,977, filed on Feb. 1, 2019, now Pat. No. 10,657,795.

(51) Int. Cl.

*G07C 9/33* (2020.01)
*G07C 9/38* (2020.01)
*G08B 25/12* (2006.01)

(52) U.S. Cl.

CPC ........ *G08B 25/12* (2013.01); *E05B 2045/069* (2013.01); *E05B 2045/0695* (2013.01)

(58) Field of Classification Search

USPC .......................................................... 340/542
See application file for complete search history.

(56) References Cited

U.S. PATENT DOCUMENTS 4,411,144 A 10/1983 Aydin
4,499,462 A 2/1985 Stoesser
4,845,490 A 7/1989 Ward et al.
5,369,913 A 12/1994 Brickner
5,397,884 A * 3/1995 Saliga ................ G07C 9/00904 235/382
5,421,178 A 6/1995 Hamel et al.
5,429,399 A 7/1995 Geringer et al.
5,473,236 A 12/1995 Frolov
5,474,348 A 12/1995 Palmer et al.
5,628,216 A 5/1997 Qureshi et al.
5,640,863 A 6/1997 Frolov
5,646,605 A 7/1997 Leonaggeo et al.
5,706,399 A * 1/1998 Bareis ..................... B60R 25/04 704/274
5,712,626 A 1/1998 Andreou et al.
5,782,118 A 7/1998 Chamberlain et al.
5,850,753 A * 12/1998 Varma ................. E05B 47/0047 292/341.16
5,857,365 A 1/1999 Armstrong
5,878,530 A * 3/1999 Eccleston ............... E05F 15/63 49/340
5,903,216 A * 5/1999 Sutsos ................ G07C 9/00182 340/904
5,918,172 A * 6/1999 Saunders .............. H04W 88/06 455/404.1
5,931,430 A 8/1999 Palmer
6,076,870 A 6/2000 Frolov
6,081,199 A 6/2000 Hogl
6,133,842 A * 10/2000 Gariepy ............... G08B 13/149 340/689
6,225,903 B1 5/2001 Soloway et al.
6,330,817 B1 12/2001 Frolov
6,354,121 B1 3/2002 Frolov
6,442,986 B1 9/2002 Russell et al.
6,603,401 B1 * 8/2003 Ueyama ............... A61B 5/0002 340/286.07
6,784,784 B1 * 8/2004 Zehrung ................. E05B 45/06 340/545.7
7,261,691 B1 * 8/2007 Asomani ................ A61B 5/002 600/347
D552,964 S 10/2007 Bogdanov et al.
7,391,319 B1 6/2008 Walker
7,468,663 B1 12/2008 Rufolo, Jr. et al.
7,872,577 B2 1/2011 Frolov
8,378,826 B2 2/2013 Mercier
8,937,658 B2 1/2015 Hicks, III et al.
8,957,757 B1 * 2/2015 Le Burge ................. G07C 9/20 340/5.6
9,077,716 B2 7/2015 Myers et al.
9,262,879 B2 2/2016 Ahearn et al.
9,322,194 B2 4/2016 Cheng et al.
9,359,794 B2 6/2016 Cheng
9,534,420 B1 1/2017 Cheng et al.
9,690,272 B2 6/2017 Chin et al.
9,892,579 B2 2/2018 Ku
9,922,481 B2 3/2018 Johnson et al.
10,062,233 B1 8/2018 Rogers et al.
10,120,354 B1 11/2018 Rolston
10,657,795 B1 5/2020 Laurans et al.
2001/0025517 A1 10/2001 Bates et al.
2002/0043024 A1 4/2002 Tanaka
2002/0057188 A1 * 5/2002 Schuster .................. G07C 9/33 340/5.2
2002/0095958 A1 7/2002 Bates et al.
2002/0180582 A1 * 12/2002 Nielsen .................... G07C 9/21 340/5.6
2003/0006879 A1 1/2003 Kang
2003/0023562 A1 * 1/2003 Bailey ................. G06F 21/6245 705/51
2003/0179074 A1 9/2003 Palomaki et al.
2004/0090327 A1 5/2004 Soloway et al.
2004/0094667 A1 * 5/2004 D'Alvia ............. B64D 45/0029 244/118.5
2004/0113778 A1 6/2004 Script
2004/0124708 A1 * 7/2004 Giehler .............. G07C 9/00182 307/10.5
2004/0177663 A1 9/2004 Walsh, III et al.
2005/0030178 A1 2/2005 Meijer
2005/0050928 A1 3/2005 Frolov et al.
2005/0082429 A1 * 4/2005 D'Alvia ................... G07C 9/38 244/118.5
2005/0167995 A1 8/2005 Wallis et al.
2005/0179267 A1 8/2005 Cote
2006/0101878 A1 5/2006 Dickhans et al.
2007/0013476 A1 1/2007 Petrovic
2007/0157684 A1 7/2007 Bogdanov et al.
2007/0204663 A1 9/2007 Lee
2007/0209413 A1 9/2007 Dobbs
2008/0122609 A1 * 5/2008 Mannisto ............. G08B 25/001 340/500
2008/0142593 A1 6/2008 Walsh et al.
2008/0169655 A1 7/2008 Gomez Gonzalez
2008/0191857 A1 8/2008 Mojaver
2008/0236213 A1 10/2008 Blanch
2008/0246587 A1 10/2008 Fisher
2009/0027197 A1 1/2009 Frolov
2009/0160660 A1 6/2009 Nurmela
2009/0201147 A1 * 8/2009 Gottlieb ............... G08B 25/016 340/532
2009/0277232 A1 11/2009 Walsh, III
2009/0282877 A1 11/2009 Laverty et al.
2010/0026487 A1 2/2010 Hershkovitz
2010/0089109 A1 4/2010 Bliding et al.
2010/0176919 A1 * 7/2010 Myers ................ G07C 9/00857 340/5.2
2010/0257906 A1 10/2010 Sorensen et al.
2010/0294008 A1 11/2010 Bogdanov et al.
2010/0300163 A1 12/2010 Loughlin
2010/0302025 A1 * 12/2010 Script .................. G08B 25/006 340/545.5
2011/0036131 A1 2/2011 Chiou et al.
2011/0067464 A1 3/2011 Chiou et al.
2011/0175730 A1 * 7/2011 Stevenson ........... E05B 63/0065 340/5.73
2011/0203331 A1 8/2011 Picard et al.
2012/0061974 A1 3/2012 Laverty et al.
2012/0192490 A1 * 8/2012 Mccaslin ............ H04L 12/2827 49/31
2012/0212001 A1 8/2012 Benitez et al.
2012/0252365 A1 * 10/2012 Lam ................... G07C 9/00309 455/41.2
2012/0304715 A1 * 12/2012 Gore ...................... G08B 13/04 70/344
2012/0324967 A1 12/2012 Goren et al.
2013/0024222 A1 * 1/2013 Dunn ................. G07C 9/00904 705/5
2013/0031940 A1 2/2013 Romero
2013/0061644 A1 3/2013 Trent et al.
2013/0109342 A1 * 5/2013 Welch ................... H04W 4/029 455/404.2
2013/0192316 A1 8/2013 McKibben et al.
2013/0318519 A1 11/2013 Coolidge

(56) References Cited

U.S. PATENT DOCUMENTS

2013/0335222 A1* 12/2013 Comerford ............. E05B 65/00 340/542
2014/0002236 A1* 1/2014 Pineau ............... G07C 9/00309 340/5.6
2014/0013407 A1* 1/2014 Tilly ..................... H04L 63/062 726/6
2014/0109633 A1 4/2014 Romero
2014/0109634 A1 4/2014 Almomani et al.
2014/0113563 A1 4/2014 Almomani et al.
2014/0118107 A1 5/2014 Almomani
2014/0157842 A1 6/2014 Almomani et al.
2014/0159392 A1 6/2014 Tsai et al.
2014/0165673 A1 6/2014 Tyner et al.
2014/0208651 A1* 7/2014 Wolfe ................. E05B 65/0811 49/24
2014/0250956 A1 9/2014 Chong
2014/0260448 A1 9/2014 Beck et al.
2014/0260449 A1 9/2014 Uyeda et al.
2014/0260451 A1 9/2014 Quach et al.
2014/0265359 A1 9/2014 Cheng et al.
2014/0266669 A1 9/2014 Fadell
2014/0292001 A1 10/2014 Nunez et al.
2014/0320282 A1 10/2014 Zhang
2015/0022338 A1* 1/2015 Hwang .................. G08B 5/222 340/501
2015/0025790 A1* 1/2015 Hwang .................. G01C 21/34 701/410
2015/0112885 A1* 4/2015 Fadell .................. G08B 29/185 705/330
2015/0117619 A1* 4/2015 Carpenter .......... G07C 9/00182 379/39
2015/0124087 A1* 5/2015 Jones, Jr. ............... G08B 15/02 348/143
2015/0184425 A1 7/2015 Ellis et al.
2015/0240528 A1 8/2015 Mani et al.
2015/0240529 A1 8/2015 Dore Vasudevan et al.
2015/0247345 A1 9/2015 Carpenter et al.
2015/0281228 A1 10/2015 Rettig et al.
2015/0288797 A1* 10/2015 Vincent .................. G16H 10/60 455/404.2
2015/0309487 A1 10/2015 Lyman
2015/0371467 A1* 12/2015 Wang ................. G07C 9/00309 340/5.6
2016/0040452 A1 2/2016 Ku
2016/0055698 A1* 2/2016 Gudmundsson ......... G07C 9/32 340/5.52
2016/0060904 A1 3/2016 Dore Vasudevan et al.
2016/0072832 A1 3/2016 Kim
2016/0115720 A1 4/2016 Wong et al.
2016/0145898 A1 5/2016 Ohl et al.
2016/0168888 A1 6/2016 Farias et al.
2016/0189496 A1 6/2016 Modi
2016/0253855 A1 9/2016 Lowder
2016/0275780 A1* 9/2016 Macy ................... G08B 25/006
2016/0275781 A1 9/2016 Nold
2016/0341537 A1 11/2016 Ku
2016/0378961 A1* 12/2016 Park ........................ G06F 21/36 726/19
2017/0002586 A1* 1/2017 Lee ......................... E05B 39/00
2017/0004687 A1 1/2017 Wu
2017/0037937 A1 2/2017 Ku
2017/0124824 A1* 5/2017 Chan ....................... H04W 4/02
2017/0161975 A1* 6/2017 Peng .................. G07C 9/00896
2017/0191287 A1* 7/2017 Mittleman .............. E05B 41/00
2017/0204637 A1 7/2017 Matyko
2017/0205827 A1 7/2017 Rezvani
2017/0228954 A1* 8/2017 Evans .................. G07C 9/0069
2017/0318322 A1* 11/2017 Lamb ............... H04N 21/42204
2017/0342742 A1 11/2017 Snodgrass
2017/0342750 A1 11/2017 Hiramine
2018/0047230 A1 2/2018 Nye
2018/0061163 A1 3/2018 Ku
2018/0075720 A1 3/2018 Davies et al.
2018/0075754 A1* 3/2018 Salter .................... H04W 4/023
2018/0091381 A1 3/2018 McLaughlin
2018/0108228 A1 4/2018 Lovejoy
2018/0143321 A1 5/2018 Skowronek
2018/0165637 A1 6/2018 Romero
2018/0211462 A1* 7/2018 Wendling ........... G07C 9/00309
2018/0247070 A1* 8/2018 Evans .................... G08B 25/12
2018/0308045 A1 10/2018 Arena
2018/0320412 A1 11/2018 Matosian
2018/0320413 A1 11/2018 Wong
2018/0330599 A1 11/2018 Burke
2018/0340352 A1 11/2018 Compton
2018/0367419 A1* 12/2018 Hall ....................... G06Q 10/08
2018/0367968 A1* 12/2018 Golichowski ......... H04W 4/023
2019/0019365 A1 1/2019 Lee
2019/0060681 A1 2/2019 White
2019/0096202 A1 3/2019 Seelman
2019/0147674 A1* 5/2019 Choi ...................... G06Q 10/02 705/5
2019/0206164 A1* 7/2019 Chae ........................ G07C 9/32
2019/0213817 A1* 7/2019 Wechsler ........... G07C 9/00563
2019/0257116 A1 8/2019 Coster et al.
2019/0309539 A1 10/2019 Mukundala et al.
2019/0383057 A1 12/2019 Larson
2020/0002973 A1 1/2020 Hill
2020/0011088 A1 1/2020 Harris
2020/0011090 A1 1/2020 Ku et al.
2020/0032551 A1 1/2020 Holmes et al.
2020/0051348 A1* 2/2020 Wang ..................... G06Q 10/10
2020/0071955 A1 3/2020 Binek et al.
2020/0123808 A1 4/2020 Lovejoy et al.
2020/0149317 A1 5/2020 Seacat et al.
2020/0149320 A1 5/2020 Pfunder
2020/0157851 A1 5/2020 Fodstad et al.
2020/0248484 A1 8/2020 Arlinghaus et al.
2020/0263449 A1 8/2020 Rai et al.
2020/0279474 A1 9/2020 Laurans et al.
2020/0291678 A1 9/2020 Eickhoff et al.
2021/0040775 A1 2/2021 Kusanale et al.
2021/0054657 A1 2/2021 Luebeck et al.
2021/0079691 A1 3/2021 Sundkvist et al.
2021/0148136 A1 5/2021 Kim et al.
2021/0174620 A1 6/2021 Kusanale et al.
2021/0214970 A1 7/2021 Yang et al.
2021/0348422 A1 11/2021 Kumar et al.

FOREIGN PATENT DOCUMENTS

CN 105840003 A 8/2016
CN 107795195 A 3/2018
CN 207620532 U 7/2018
CN 108643715 A 10/2018
CN 110242112 A 9/2019
CN 110388138 A 10/2019
CN 112343426 A 2/2021
CN 112396732 A 2/2021
CN 213774876 U 7/2021
CN 113250536 A 8/2021
DE 41 02 892 A1 8/1992
DE 10 2006 001 478 A1 7/2007
DE 10 2011 081 789 A1 4/2012
EP 0 315 766 A2 5/1989
EP 0 505 887 A1 9/1992
EP 2 136 019 A2 12/2009
EP 2 208 840 A2 7/2010
EP 2 746 497 A2 6/2014
EP 3 599 329 A1 1/2020
JP 2010-112002 A 5/2010
JP 2015-158892 A1 9/2015
JP 2015-202767 A 11/2015
KR 10-2005-0074820 A 7/2005
KR 10-2006-0039712 A 5/2006
KR 20-0468708 Y1 8/2013
KR 20-0484625 Y1 10/2017
KR 10-2018-0083157 A 7/2018
KR 20-2020-0001831 U 8/2020
WO WO 01/12931 A1 2/2001
WO WO 2004/088069 A1 10/2004
WO WO 2007/020623 A2 2/2007
WO WO 2007/065200 A1 6/2007

(56) References Cited

FOREIGN PATENT DOCUMENTS

| | | | |
|---|---|---|---|
| WO | WO 2007/104499 | A2 | 9/2007 |
| WO | WO 2012/015135 | A1 | 2/2012 |
| WO | WO 2012/116037 | A1 | 8/2012 |
| WO | WO 2017/046399 | A1 | 3/2017 |
| WO | WO 2019/018897 | A1 | 1/2019 |
| WO | WO 2019/044962 | A1 | 3/2019 |
| WO | WO 2019/071306 | A1 | 4/2019 |
| WO | WO 2021/053435 | A1 | 3/2021 |
| WO | WO 2021/092660 | A1 | 5/2021 |

OTHER PUBLICATIONS

International Preliminary Report on Patentability for International Application No. PCT/US2020/015554, mailed Aug. 12, 2021.
U.S. Appl. No. 16/876,485, filed May 18, 2020, Laurans et al.
PCT/US2020/015554, Jun. 26, 2020, International Search Report and Written Opinion.
PCT/US2020/015554, Aug. 12, 2021, International Preliminary Report on Patentability.

* cited by examiner

ALARM SYSTEM WITH FIRST RESPONDER CODE FOR BUILDING ACCESS

RELATED APPLICATION

This Application is a continuation of U.S. patent application Ser. No. 16/876,485, filed May 18, 2020, which is a continuation of U.S. patent application Ser. No. 16/264,977, filed Feb. 1, 2019, each of which is herein incorporated by reference in its entirety.

BACKGROUND

1. Field of Invention

This invention relates to building alarm systems and door locks for automating door lock functions.

2. Related Art

Electronic door lock actuators, including so-called smart locks that are used to actuate existing door lock mechanisms, are known, e.g., as described in US Patent Application Publication US20170037937. Such door lock arrangements can allow a user to both operate the door lock manually, e.g., by operating a thumb turn, and electronically, e.g., by interacting with the door lock via an electronic device such as a smartphone. Alarm systems are also known in the art, e.g., for monitoring a building with respect to various conditions such as unauthorized entry through doors and/or windows, fire or smoke conditions, movement in a room or around a building, etc.

SUMMARY OF INVENTION

Aspects of the invention provide the ability for first responder personnel, such as fire, police or emergency medical technicians, to gain access to a building using a first responder code to cause an automated door lock to disengage to allow an associated door to be moved from a closed position to an opened position in case that an alarm system at the building indicates an alarm condition indicative of an emergency condition, such as smoke or fire at the building, forced entry into the building, or a medical emergency at the building. In cases where automated door lock systems are not integrated with an alarm system, an alarm system may enter an alarm state in response to a condition, such as detected fire, and notify authorities. However, once first responder personnel such as firefighters, arrive at the building, the firefighters may be compelled to force entry into the building because automated door locks remain engaged to lock doors in a closed position. This may cause unnecessary damage to doors or other building components. On the other hand, integrated door lock and alarm systems may cause door locks to automatically disengage to unlock and allow doors to be opened in response to a detected fire, e.g., so that people inside the building can exit. However, this unlocking of doors can allow others to enter the building during the detected fire, including unwitting persons who normally are authorized to enter the building but may be exposed to the fire or other dangerous conditions, or thieves who intentionally defeat the door lock system by causing detection of a fire condition and gaining entry when the doors are automatically unlocked. Aspects of the invention provide for a first responder code which may be used by first responder personnel to cause one or more locked doors to be unlocked by an automated door lock in case of a detected emergency condition that causes an alarm system to indicate an alarm state. Thus, doors may remain locked during an emergency condition until first responder personnel arrive, and then may be unlocked in response to a first responder code.

In one embodiment, an alarm system includes a door lock associated with a door of a building where the door lock is arranged to engage to lock the door in the closed position and to disengage to unlock the door and permit movement of the door from the closed position to an open position. The door lock may be arranged to be operated remotely, e.g., to operate to lock or unlock a door in response to electronic signals from a user provided via a user device (such as a smartphone) or other electronic device. For example, a user may be able to cause the door lock to engage and/or disengage to lock and unlock an associated door from any location, whether at the building or miles away. The alarm system may also include a base station configured and arranged to enter an armed state in which the base station indicates an alarm state in response to an emergency condition including detection of smoke or fire at the building, detection of forced entry into the building, or detection of a medical emergency at the building. (The term base station is used to refer to any single component or set of components, including a distributed system of components that operate to monitor conditions at a building and enter an alarm state based on detected conditions. More information is provided below.) The door lock may be configured to disengage to unlock a door and permit movement of the door from the closed to the open position in response to a first responder code received only after the base station indicates the alarm state. This may allow the door lock, if locked when the base station enters an alarm state, to allow first responders using the first responder code to gain access to the building by unlocking the associated door. However, the door lock may be configured to remain engaged to lock the door in the closed position in response to the first responder code if the base station is not in an alarm state. That is, a person using a first responder code in an attempt to cause the door lock to disengage to unlock the door will not be successful unless the base station is in the alarm state. The door lock and base station may communicate with each other, either in one way or two way fashion, so that the door lock is enabled to allow use of the first responder code to cause the door lock to disengage only in response to the base station indicating the alarm state.

First responder personnel may provide the code to the door lock in a variety of different ways. For example, the first responder code may provided to the door lock via a keypad at the building, e.g., a person may type the code into the keypad, or the first responder code may be communicated electronically from a first responder communication device to the door lock, e.g., via a wireless communications system. First responders may receive the code in response to the alarm system indicating the alarm state, e.g., the alarm system or lock server may generate a first responder code when the alarm state regarding an emergency condition is indicated, and send the first responder code to first responder personnel and to the door lock via electronic communications. Thus, the first responder code may be unique and generated at the time an alarm state is indicated, which can help reduce the chance that a first responder code can be used to gain unwanted or unauthorized access to the building. In other embodiments, first responder personnel may have a first responder code in their possession prior to the alarm system indicating the alarm state indicative of an emergency condition, and the first responder code may be usable to unlock a door at the building only when the alarm system indicates the alarm state. For example, first responder personnel may carry a keyfob, key card or other device that can communicate a first responder code to the door lock via electronic communications (e.g., wired or wireless). Alternately, first responder personnel may carry a physical card or other article that bears a human readable version of the code, which may be typed or spoken to the door lock to provide the code to the door lock, or first responder personnel may recall the code from personal memory. A first responder code may be reusable for multiple different alarm states indicated by an alarm system, or may be usable only a single time for one alarm state. The first responder code may be usable only while the alarm state is indicated, or for a limited period of time after the alarm state is indicated.

The alarm system can detect the fire or smoke condition, forced entry condition, or medical emergency condition in different ways. For example, a base station may detect a medical emergency in response to information from a sensor arranged to detect a person's vital signs. One or more people at the building may be monitored by one or more sensors that can detect respiration rate, pulse, blood pressure, etc. and provide the detected information to the base station. If the base station detects a condition that indicates a medical emergency, such as a person with low or no pulse, an alarm state indicative of an emergency condition may be indicated. In other embodiments, the base station may detect a medical emergency in response to a signal from a user device that is activated by a person. For example, the user device may include a panic button and the signal indicating the medical emergency is sent from the user device to the base station in response to the person pressing the panic button. Other sensors may be used to detect other conditions, such as fire or smoke conditions or forced entry conditions, and the base station may indicate an alarm state based on received sensor information. As an example, forced entry conditions may be detected by a door sensor detecting a door moving from a closed position to an open position while an associated door lock is engaged in the locked position, or by a glass break sensor detecting breakage of window or door glass at the building, or by detecting movement in the building while the alarm system is in an away mode. In addition to indicating an alarm state in response to fire or smoke conditions or forced entry conditions at the building, or a medical emergency at the building, the alarm system may indicate an alarm state in response to other detected conditions. For example, the base station may be configured and arranged to enter an armed state in which the base station indicates an alarm state in response to one or more of the following: detection of movement within the building, detection of opening of a window of the building, detection of opening of a door of the building, detection of sound within the building, detection of breakage of glass at the building, detection of people in or around the building, and detection of a low temperature or water at the building. Such conditions may be indicative of non-emergency conditions, and in such cases a first responder code may not be usable to gain access to the building. One or more sensors may be used to generate a signal representing conditions, e.g., detection of movement within the building, detection of opening of a window of the building, detection of sound within the building, detection of breakage of glass at the building, detection of fire or smoke in the building, detection of people in or around the building, and detection of a low temperature or water at the building, and the base station may be arranged, when in an armed state, to indicate an alarm state based on a signal from the one or more sensors.

The base station may include one or more components and may be arranged to operate within the building and/or at a remote location. The base station may be arranged to communicate with a monitoring server that is remote from the building, and the base station may be arranged to send a signal representing the alarm state to the monitoring server. The monitoring server may provide functions for the alarm system, such as notifying authorities of an alarm state, managing the creation and/or sending of a first responder code to first responder personnel and/or the door lock, storing sensor information, notifying a user of an alarm state and/or sensed conditions at the building (e.g., by sending signals to a user device and displaying information on the user device), and so on.

Other advantages and novel features of the invention will become apparent from the following detailed description of various non-limiting embodiments when considered in conjunction with the accompanying figures and claims.

BRIEF DESCRIPTION OF THE DRAWINGS

Aspects of the invention are described with reference to the following drawings in which numerals reference like elements, and wherein.

DETAILED DESCRIPTION

Aspects of the invention are described below by way of one or more illustrative embodiments. It should be understood that the illustrative embodiments described are not intended to limit the aspects of the invention, but rather to help show how one or more aspects of the invention may be implemented in a particular example. Also, aspects of the invention may be implemented alone and/or in combination with other aspects of the invention. For example, an arrangement is described below in which an alarm system can enter an armed state in response to failure of a door lock to engage to lock an associated door. The system is also described as capable of entering an armed state in response to press of a single button by a user and/or in response to use of a particular access code to gain access to a building. In addition, a door lock may be able to unlock and allow access to first responders in response to a first responder code during fire/smoke, forced entry or medical emergency conditions. These features may be combined into a single system as described, or may be employed separately, e.g., an alarm system which can enter an armed state in response to a door lock's failure to engage need not necessarily be configured to enter an armed state in response to use of a particular access code and/or press of a single button by a user.

Figure 1:
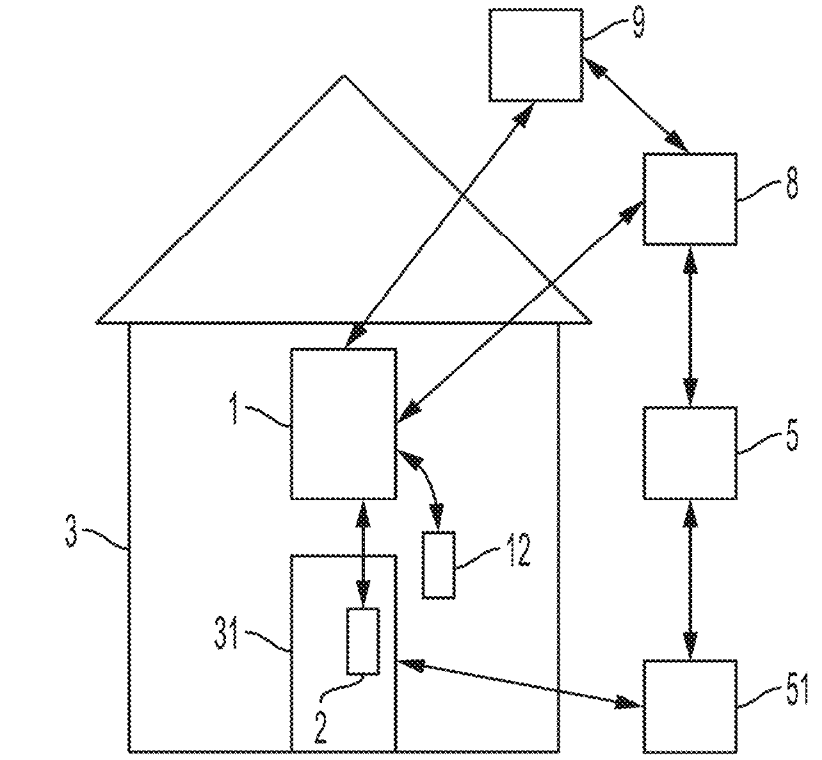
FIG. 1 is a schematic block diagram of components in an alarm system including a door lock in an illustrative configuration.

FIG. 1 shows an illustrative arrangement including an alarm system that incorporates one or more aspects of the invention. In this embodiment, a building 3 includes one or more doors 31 which may be used by persons to enter and/or exit the building 3 or to move between rooms or other spaces in the building 3. As used herein, the term "building" refers to any suitable structure that may be entered and/or exited by a person, such as a single family home, a single apartment in a multi-apartment complex, a warehouse or other industrial facility, one or more rooms or other spaces of a larger structure, and so on. The building 3 is equipped with an alarm system that may be used to monitor the building 3 for various conditions, such as use of doors 31 to enter/exit the building 3, noise at the building 3, fire and/or smoke conditions at the building 3, movement of people or objects at the building 3, abnormally high/low temperatures and/or water at the building 3, etc. (As used herein, conditions "at" a building refers to the condition being within and/or near the building, e.g., movement of persons "at" a building refers to movement of persons within and/or near the building.) As is understood in the art, the alarm system may be employed to monitor conditions at the building as well as taking particular actions in response to sensed conditions, such as notifying authorities (e.g., police, fire, building management, etc.) of particular conditions, notifying a user of particular conditions, displaying an alarm (e.g., emitting siren noises and emergency lighting at the building, etc.), recording video and/or audio conditions at the building, and so on. Thus, although the system is referred to herein as an "alarm" system, the alarm system need not necessarily display alarm sounds or lights at the building, but instead may be employed only for monitoring conditions at the building and optionally reporting on monitored conditions.

In this embodiment, the alarm system includes a base station 1 located at the building 3 which coordinates communications between the building 3 and remote devices and that can communicate with other devices located at the building 3. The base station 1 is shown as a single element, but may include two or more components, which may be located separately at the building 3 and/or remotely from the building 3. Thus, while in this embodiment the base station 1 is located at the building 3, the base station 1 may be located remotely from the building 3 at least in part, e.g., the base station 1 may be implemented at least in part at one or more computers or other data processing devices that are remote from the building 3. While the base station 1 may be configured and arranged to communicate with any number and/or type of remote devices using any suitable communications channel (e.g., wireless, wired, Internet, cellular telephone, satellite, etc.), in this embodiment the base station 1 is arranged to communicate with one or more monitoring servers 8 as well as authorities communication devices 9. The monitoring server(s) 8 may receive information and commands from the base station 1, such as alarm and other conditions sensed at the building 3, and take suitable action including sending information and commands to the base station 1, authorities devices 9, and others. For example, the base station 1 may send to the monitoring server(s) 8 information indicating an alarm condition related to unauthorized entry into the building 3, and in response the monitoring server(s) 8 may notify authorities (e.g., fire, police, etc. via the authorities communication devices 9) of the alarm condition along with other information such as the suspected point of entry into the building 3, etc. The monitoring server(s) 8 may also notify a user of sensed conditions by communicating with a user device 5, such as a smartphone, computer or other communication device. As with other communications in the alarm system, the monitoring server(s) 8 may communicate with other devices via any suitable communications network or other channel, such as wired or wireless networks, Internet, cellular telephone, satellite, etc. The monitoring server(s) 8 may provide other functions as are known in the art. For example, the monitoring server(s) 8 may relay video and/or audio information received from a camera at the building 3 to the user device 5, which may display the video and/or audio information to the user. This may, for example, allow the user to observe and communicate with a visitor at the building 3 who is seeking entry to the building 3. The user 5 may also provide commands to the monitoring server(s) 8, such as instructions to cancel an alarm state at the building 3, and the monitoring sever(s) 8 may provide suitable commands to the base station 1 accordingly. Although in this embodiment the user device 5 communicates with the base station 1 and other devices at the building 3 (such as cameras, microphones, etc.) via the monitoring server(s) 8, the user device 5 may communicate more directly with the base station 1 and/or other devices at the building 3. As an example, the user device 5 may communicate directly with an audio/video recording and display device (e.g., a camera, speaker and microphone that is part of a doorbell at the building 3) to receive audio/video data recorded from the building 3, as well as provide audio/video data for display at the building 3. Similarly, the base station 1 may communicate more directly with authorities devices 9 and/or other devices rather than via the monitoring server(s) 8. This may, for example, allow the base station 1 to relay alarm state messages to the authorities devices 9 even if communication with the monitoring server(s) 8 is interrupted.

In this embodiment, the building 3 is equipped with one or more door locks 2 that are arranged to engage to lock an associated door 31 in a closed position, and to disengage to unlock the door 31. The door lock 2 may be configured to receive commands or other information, such as a command to move a bolt, latch or other mechanism to lock or unlock the associated door 31 in a closed position. In this embodiment, the door lock 2 may communicate with a lock server 51 to send and receive commands and other information. The lock server 51 may manage operation of the door lock 2 as well as communications with the user device 5 via which the user may provide instructions for lock operation and/or receive information from the door lock 2, such as whether the door lock 2 is engaged to lock a door 31 or not. While in some embodiments the functions of the lock server 51 may be performed by the monitoring server(s) 8, in this embodiment the door lock 2 is capable of operating and being operated independently of the alarm system although the door lock 2 can coordinate at least some of its functions with the base station 1 as described more below. Thus, a user, e.g., interacting with an application running on the user device 5, may provide instructions to the lock server 51 to lock or unlock the door 31 and/or receive information regarding door lock 2 status and other conditions, and the lock server 51 may provide suitable information or commands to the door lock 2. The door lock 2 may communicate with the base station 1, either directly via a local network (e.g., Wi-Fi) or other communications channel, or more indirectly via the lock server 51 which may communicate with the monitoring server(s) 8 via the Internet or any other suitable communications network(s) or channels. Thus, the base station 1 may receive information from the door lock 2, such as whether the door lock 2 is engaged or not to lock the door 31 in a closed position. As noted above, the alarm system may include sensors to detect various conditions at the building 3, and FIG. 1 shows one such sensor, i.e., a door sensor 12 that can detect whether the door 31 is in an open or closed position. The door sensor 12 may be part of the door lock 2, or may be independent of the door lock 2, e.g., part of the alarm system such that the door sensor 12 communicates to the base station 1 whether an associated door is open or closed. Therefore, the base station 1 may receive information regarding whether the door 31 is in an open or closed position as well as whether the door lock 2 is engaged or not to lock the door 31 in a closed position.

In accordance with an aspect of the invention, the base station may be configured and arranged to enter an armed state in response to a signal from the door lock indicating that the door lock is unable to engage to lock the door in the closed position. This may occur, for example, when a user sends a command to the door lock 2, e.g., via the user device 5 and the lock server 51, to engage to lock the door 31 associated with the door lock 2, but the door lock 2 is unable to engage to lock the door. Normally, when the door lock 2 receives a command to engage to lock an associated door 31, the door lock 2 will properly engage. However, in some cases the door lock 2 may not be able to engage to lock the door, e.g., because the door 31 is closed but not positioned properly so that a lock bolt, latch or other mechanism can move to lock the door 31. This can occur with almost any type of door, but potentially more often with older doors which can be closed but still not properly positioned to allow a door lock mechanism to engage. In some embodiments, the door lock 2 may request assistance from the user to properly position the door 31 so the lock 2 can engage or otherwise notify the user of the failure to engage, e.g., by sending a message to the user device 5. In other cases, for example, the door lock 2 may have insufficient electrical power to engage a bolt, latch or other lock mechanism, or there may be other causes for why the door lock 2 cannot properly engage to lock an associated door. In such cases, the user may believe the door was locked even though the door lock 2 could never properly engage. By having the base station 1 enter an armed state when a door 31 is closed but a door lock 2 fails to engage as commanded, the base station 1 can monitor movement of the door 31 and indicate an alarm state if the door 31 moves from the closed to the open position. In this way, opening of the unlocked door 31 can cause the alarm system to enter an alarm state in which an alarm condition may be signaled, e.g., by sounding a siren, notifying authorities, notifying a user, etc.

The armed state that the base station 1 enters in response to a signal indicating that a door lock cannot engage to lock a door may be configured in a variety of different ways. In one embodiment, the armed state is one in which the base station indicates an alarm state upon detection by a door sensor of the door (which could not be locked by the door lock) moving from the closed position to the open position. The alarm state of the base station can cause different actions or combinations of actions to occur. For example, the base station 1 may send a signal to the monitoring server(s) 8 that the door 31 has been opened, and in response the monitoring server(s) 8 may notify the user device 51 of the opened door 31, notify authorities via the authorities devices 9, etc. The base station 1 alternately or in addition may indicate an audible or visual alarm at the building 3, may activate an automatic door closer which urges the door toward a closed position, may display an audible request to close the opened door 31, may begin recording video and/or audio information from an area around the opened door 31, etc. The base station 1 may receive information regarding movement of the door 31 from the closed position to an open position in different ways, such as by a signal from a door sensor 12, from the door lock 2, by detecting movement of the door 31 via a movement sensor in a room of the building near the door 31, etc.

The armed state into which the base station 1 enters in response to failure of a door lock to engage to lock a door may also be arranged to cause the base station to indicate an alarm state in response to other sensed conditions in addition to movement of the unlocked door from the closed to the open position. For example, the armed state may be an "away" mode in which the base station generates an alarm state upon detection of the unlocked door moving from the closed position to an open position as well as upon one or more of the following: detection of movement within the building, detection of opening of a window of the building, detection of sound within the building, detection of breakage of glass at the building, detection of smoke and/or fire at the building, detection of people in or around the building, and detection of a low temperature or water at the building, and others. Thus, even if a user intended to only lock the door 31 but did not intend to arm the alarm system, if the door lock 2 fails to engage to lock the door 31, the alarm system may enter into an armed state that indicates an alarm state in response to a variety of different conditions in addition to opening of the unlocked door.

While an "away" mode may be effective if the door is to be locked when no people are in the building or intended to be in the building, the "away" mode may not be suitable for all situations. For example, if a user attempts to lock the door using the door lock 2 while a person is in the building, an "away" mode or other alarm mode that indicates an alarm state in response to movement within the building or other activity normally engaged in by authorized persons in the building may cause a false alarm. Therefore, in some embodiments, the base station may enter into a "home" mode in response to failure of a door lock to engage to lock a door. In one embodiment, the "home" mode may be one in which the alarm system generates an alarm state upon detection of the door moving from the closed position to an open position, but does not generate an alarm condition upon detection of movement within the building or other normal conditions when an authorized person is in the building, such as opening and closing of interior doors, opening a window, etc. This may help reduce the occurrence of false alarms. The "home" mode may still indicate an alarm condition for other sensed conditions, e.g., conditions that relate to safety of individuals at the building, such as smoke or fire at the building, low temperatures or water at the building, etc.

In some cases, a user may select to have the alarm system enter an away mode or home mode in response to failure of a door lock to engage. For example, the base station may initially enter a home mode upon indication that a door lock fails to engage to lock a door. However, if the base station fails to detect movement or other activity in the building indicative of the presence of authorized persons at the building for a time period after the indication of the door lock engagement failure (e.g., 15 seconds to 5 minutes or more), the base station may switch to an away mode. Alternately, the base station may initially enter an away mode upon indication of a door lock's failure to engage to lock a door, and then switch to a home mode if movement or other normal activity is detected within the building within a particular time period.

Figure 2:
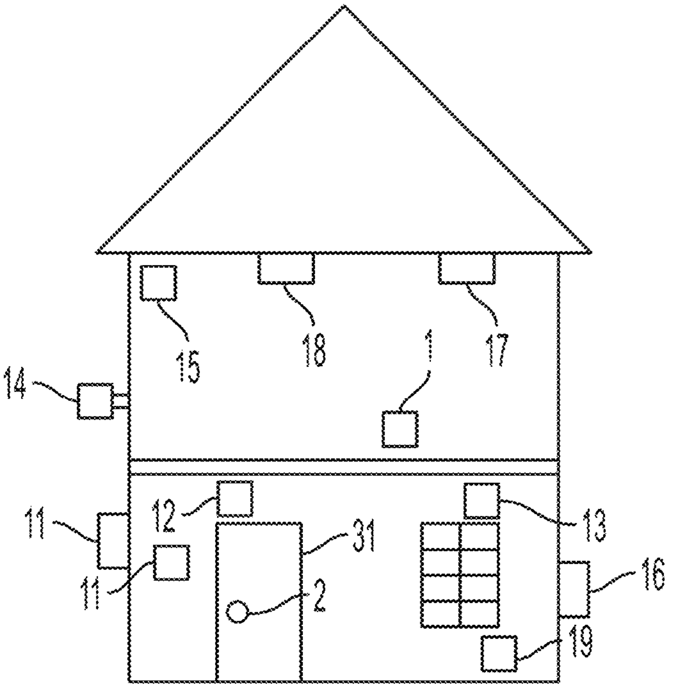
FIG. 2 is a schematic block diagram illustrating various sensors and other components for use with a building alarm system in the FIG. 1 embodiment.

FIG. 2 shows a close up view of the building of FIG. 1 and additional, optional sensors that may be included with the alarm system in some embodiments. Although other arrangements are possible, the alarm system in FIG. 2 includes one or more keypads 11 that a user may employ to provide information to and/or receive information from the base station 1. For example, the keypad 11 may have a number pad or other arrangement to allow a user to enter an alphanumeric string or other code to the base station 1, e.g., to place the base station 1 in an armed or unarmed state, to configure the alarm system in one or more ways, to silence or initiate an alarm state, to communicate with the monitoring server(s) 8 and/or authorities devices 9, to provide a code to the door lock 2 to unlock an entry door, etc. As an example, if a user enters the building 3 while the alarm system is in an armed state, the user may employ the keypad 11 to enter an entry code or other information to prevent the alarm system from indicating an alarm state, e.g., in which authorities are notified of an alarm condition. One or more keypads 11 may be provided within or outside of the building 3, as desired. In addition, or alternately, a user may interact with the base station 1 via the user device 5, e.g., a keypad 11 may be implemented via a user interface on the user device 5.

In one aspect of the invention, the alarm system may be arranged to enter an armed state and a door lock engaged to lock an associated door in response to a user pressing a single button, e.g., on a keypad 11, and/or in response to use of a specific code, e.g., to gain access to the building 3. As an example, a user may press a single button on a keypad 11 after entering the building 3 so that the base station 1 enters an armed state (e.g., a home mode) and one or more door locks 2 are engaged to lock their associated doors 31 in a closed position. Where door locks 2 are not fully integrated with the alarm system, the base station 1 may send a signal to the door lock(s) 2 at the building instructing the door lock(s) 2 to engage to lock their associated doors 31 in response to button press on the key pad 11. Such a signal may be sent directly from the base station 1 to the door lock(s) 2, or via the monitoring server(s) 8, lock server 51, and/or other devices via any set of suitable communication channels. Such an arrangement may allow a user to easily and rapidly re-arm an alarm system as well as lock any unlocked doors in a single action.

As another example, a user may enter a particular code into a keypad 11 to gain access to the building 3 (e.g., to place the base station 1 in an unarmed state so doors can be opened without triggering an alarm condition and/or to unlock an entry door) and thereafter the base station 1 may automatically enter an armed state and one or more door locks 2 may automatically engage to lock their respective doors 31. These rearming and lock engagement features may be activated automatically without further action required by the user and may allow for easier and more foolproof arming of an alarm system and locking of doors for particular users. As an example, a child may be associated with a specific code to gain access to a building 3. Thus, the child may use the code, e.g., with a keypad 11, keyfob, or user device 5, to cause the base station 1 to enter an unarmed state and/or to unlock an entry door 31 so the child can enter the building 3 without triggering an alarm condition. Thereafter, the base station 1 may enter an armed state and door locks 2 may engage to lock respective doors 31, e.g., after a period of time has elapsed since the code was used, after a door 31 was opened and closed by the entering child, or other condition that indicates the child has entered the building 3 and the alarm system can be rearmed and doors locked. This may help ensure that an alarm system is armed and doors locked after a child has returned home, thereby avoiding any potential problem that a child may forget to lock doors and rearm the alarm system. Of course, these features may be employed for any user, regardless of the user's age.

As another example, use of a single button by a user whether on a keypad 11, user device 5 or other user interface with the base station 1 or door lock 2 may allow a user to more simply and reliably both arm an alarm system and lock doors of a building 3. This feature may be particularly useful if door locks 2 at the building 3 are not fully integrated with the alarm system. That is, door locks 2 may be provided separately from an alarm system, and may be operated independently of the alarm system. For example, a user may enjoy regular use of remote activated door locks 2 via a user device 5 and the lock server 51, but may use an alarm system less frequently. Thus, a user may interact with the alarm system less than the door lock system, and the door lock system may have a completely separate interface (whether on the user device 5 or other interface) than the alarm system. By providing the user with a single button to activate to both arm an alarm system and lock building doors, the user may be ensured that both functions are employed. As an example, the user interface on the user device 5 for the door lock 2 (or the alarm system) may include a single button (via touch screen or other interface like a keypad 11) that a user can activate to arm the alarm and lock doors. The user may receive feedback from the base station 1 and the door locks 2 that the alarm system is suitably armed and doors locked, all in response to a single action by the user.

As with other embodiments, the armed state into which the base station 1 enters in response to single button activation and/or specific code use may be arranged in different ways. For example, in the armed state, the base station may indicate an alarm state in response to one or more of the following: detection of movement within the building, detection of opening of a window of the building, detection of opening of a door of the building, detection of sound within the building, detection of breakage of glass at the building, detection of fire in the building, detection of people in or around the building, and detection of a high/low temperature or water at the building and others. As noted above, the armed state may be an "away" mode or "home" mode or other configuration for the alarm system in which different sensed conditions cause the base station to indicate an alarm condition. FIG. 2 shows a variety of different sensors that may be employed by the alarm system to detect conditions at the building 3, such as a door sensor 12 to detect whether a door is in an open or closed position, a window sensor 13 to detect whether a window is opened or closed, a camera 14 which may detect visual and/or audible information at the building 3 such as the presence of persons or noise at the building, a motion sensor 15 which can detect motion of persons or objects but not necessarily detect video information, a microphone 16 or other sound detector which can detect noises such as breaking of glass, loud impacts such as hammering, talking by people, etc., a smoke (including carbon monoxide) and/or fire detector 17, a siren 18 to make audible sounds such as to indicate an alarm condition, a temperature and/or water sensor 19 to detect a temperature and/or the presence of water in abnormal locations, and others. The base station 1 may be in communication with all of the sensors at the building, and may be arranged to record sensor information, such as video or other data for later review by a user. Those of skill in the art will appreciate the variety of sensors that may be employed with an alarm system, and how the information detected by the sensors may be used, recorded or otherwise handled for use with the alarm system.

In another aspect of the invention, a door lock may be arranged to disengage to permit movement of an associated door from a closed position to an open position in response to a first responder code received only during a period after the base station indicates an alarm state. For example, the alarm system may indicate an alarm state in response to an emergency condition including detection of smoke (including carbon monoxide) or fire at the building, detection of forced entry into the building, or detection of a medical emergency at the building, and during a period after the alarm system indicates the alarm state indicative of an emergency condition, a door lock may disengage from a locked state to an unlocked state in response to receipt of a first responder code. As a result, the door lock may allow first responder personnel, such as fire or medical personnel, access to the building in case of an emergency condition, such as a fire, forced entry and/or injury to a person in the building. During other times, such as when the alarm system is armed but not indicating an alarm state, a first responder code may not cause the door lock to disengage from a locked state. This may give users of the alarm system, including people who dwell in the building, comfort that no person—including police and fire personnel—can gain access to the building by using a first responder code unless the alarm system is indicating an alarm condition. Also, by having the door lock disengage from a locked to an unlocked state in response to a first responder code, rather than simply in response to the alarm system indicating an alarm state, the building can be secured against unauthorized entry, especially conditions created by a person seeking unauthorized entry. For example, some alarm systems may operate to unlock doors to the building in response to an alarm system indicating an alarm state. However, such a system can be exploited, e.g., by a thief introducing smoke into the building, thereby causing the smoke to be detected by the alarm system and doors to be unlocked in response to the alarm condition. In contrast, having a door lock disengage from a locked to an unlocked state in response to a first responder code avoids such problems.

The first responder code can be provided to cause a door lock to disengage in different ways, including ways that reduce or eliminate any time between first responder arrival at the building and unlocking of a door so personnel can gain entry to the building. For example, first responder personnel may be provided with a key fob, access card or similar device that can communicate a first responder code to a door lock. The key fob or other device can provide the first responder code via wired or wireless communication, such as by plugging the key fob into a reader or other communications interface that communicates the first responder code to the door lock. Such systems can be implemented using RFID tags, card readers or similar communications systems. In other embodiments, the first responder code can be typed, spoken or otherwise entered by first responder personnel, e.g., using a key pad or other user input at the building. The first responder code may be provided in encrypted form, e.g., when communicated electronically via wired or wireless communications, to help reduce a chance that unauthorized people can gain access to or otherwise use the first responder code in an unauthorized way. In some embodiments, the first responder code may be provided for single event or alarm condition use such that the first responder code can only be used during a single, associated alarm condition or a single time. For example, upon an alarm system detecting an emergency condition, the alarm system (e.g., a base station 1 or a monitoring server 8 or lock server 51 which receives notice of an alarm condition from the base station 1) may generate and send a unique first responder code to first responder personnel (e.g., directly to first responder personnel communication devices via a wireless network, and/or via the authorities communication devices 9). When first responder personnel arrive at the building, the personnel may provide the first responder code to the alarm system and/or door lock, e.g., via short range RF communications, manually entering the code into a user interface, displaying the code for optical reading by the alarm system or door lock, etc. After the first responder code generated for the alarm condition is used to gain access, the code may expire and not be usable again for another alarm condition.

In some embodiments, the first responder code may expire once the alarm condition that prompted sending of the first responder code is cleared. Thus, the code may be used multiple times during a single emergency condition, but once the alarm condition is cleared, the code may be made invalid. In some embodiments, the first responder code may be valid and usable only once or for a period of time, such as 30 minutes, after an alarm condition is indicated by an alarm system, even if the alarm condition is cleared. After the period of time, the code may be invalid.

The alarm system may detect an emergency condition in a variety of different ways. For example, a base station may receive information from one or more sensors arranged to detect a person's vital signs, and if the information indicates a medical emergency, such as an indication of a pulse rate above or below a particular range, or breathing rate above or below a particular range, or blood pressure above or below a particular range, or other characteristic of a person that indicates a medical emergency, the base station may indicate an alarm condition indicative of a medical emergency. In response, the base station 1 or monitoring server 8 can provide information to authorities communication devices 9, e.g., to summon medical personnel to the building 3, and/or to the lock server 51, which sends a signal to the door lock 2 indicating that a first responder code is usable to gain entry to the building 3. As noted above, a first responder code may be sent to first responder personnel, e.g., from the lock server 51 to the authorities communication devices 9, and/or to the door lock 2 so that the first responder code can be used to cause the door lock 2 to disengage. In other embodiments, an alarm system can detect an emergency condition in response to a signal from a user device that is activated by a person, e.g., the user device may include a panic button and when a user presses the panic button, the user device may send a signal from the user device to the base station indicating an emergency condition. The alarm system may detect an emergency condition in other ways, such as based on information from one or more sensors such as a smoke or fire sensor, and so on. As an example, in the case of a forced entry emergency condition, detection of movement of a locked door from a closed to open position, breakage of door or window glass, movement within the building when the alarm system is in an away or other similar mode, and others, may be used to detect an emergency forced entry condition.

The alarm system may be capable of detecting other alarm conditions in addition to smoke/fire, forced entry and emergency medical conditions, although an alarm state indicated by the alarm system may not enable use of a first responder code to gain access to the building. For example, the alarm system may include one or more sensors to generate a signal representing one or more of the following: detection of movement within the building, detection of opening of a window of the building, detection of sound within the building, detection of breakage of glass at the building, detection of people in or around the building, and/or detection of a low temperature or water at the building. When in an armed state, the base station or other alarm system component may indicate an alarm state based on a signal from the one or more sensors, such as breakage of glass. However, such an alarm state may not enable use of a first responder code to gain access to the building. In some embodiments, a user may set which alarm states can enable use of a first responder code to gain access to a building. For example, certain alarm states may cause the alarm system to notify police or other authorities, such as sensed conditions that indicate a break-in to the building, and for such alarm states, a first responder code may be authorized for use to gain entry to the building. However, other alarm states, such as sensed conditions that indicate water in the building or a low temperature, may not cause the alarm system to notify authorities and so no first responder code is needed. As another example, sensed conditions at the exterior of a building, such as unauthorized movement of people around a building, may cause the alarm system to indicate an alarm state but access to the building interior is not necessary for police or other first responder personnel. In such cases, a first responder code need not be authorized for use.

Each of the components in FIGS. 1 and 2 may be implemented, at least in part, by a suitably programmed computer or other data processor, and may be employed in the form of software modules, ASICs, programmable arrays, or any other suitable arrangement, in addition to hardware components. For example, computer-implemented portions of the base station 2, door lock 2, monitoring server 8, authorities devices 9, lock server 51, etc. may be implemented at least in part as single special purpose integrated circuits (e.g., ASICs), or an array of ASICs, each having a main or central processor section for overall, system-level control and separate sections dedicated to performing various different specific computations, functions and other processes under the control of the central processor section, as a plurality of separate dedicated programmable integrated or other electronic circuits or devices, e.g., hardwired electronic or logic circuits, such as discrete element circuits or programmable logic devices, as a programmed general purpose computer and/or other data processing device along with suitable software or other operating instructions, one or more memories (including non-transient storage media that may store software and/or other operating instructions), and so on. The devices may also include other components, such as an information display device, user input devices (such as a keyboard, user pointing device, touch screen or other user interface), data storage devices, communication devices, a power supply for the control circuitry and/or other system components, temperature and liquid level sensors, pressure sensors, RFID interrogation devices or other machine readable indicia readers (such as those used to read and recognize alphanumeric text, barcodes, security inks, etc.), video recording devices, speakers or other sound emitting devices, input/output interfaces (e.g., such as the user interface to display information to a user and/or receive input from a user), communication buses or other links, a display, switches, relays, triacs, motors, mechanical linkages and/or actuators, or other components necessary to perform desired input/output or other functions.

While aspects of the invention have been described with reference to various illustrative embodiments, such aspects are not limited to the embodiments described. Thus, it is evident that many alternatives, modifications, and variations of the embodiments described will be apparent to those skilled in the art. Accordingly, embodiments as set forth herein are intended to be illustrative, not limiting. Various changes may be made without departing from the spirit of aspects of the invention.

The invention claimed is:

1. A method comprising:

receiving, by a door lock of a system, communications that include a code, the code being generated at a time an alarm state is indicated and by another component of the system in response to the system entering the alarm state;

receiving, by the door lock, an electronic signal to cause operation of the door lock to permit movement of a door from a closed position to an open position, the electronic signal including the code; and unlocking, by the door lock, the door to enable movement of the door to the open position in response to receipt of the electronic signal, wherein the code is usable to cause operation of the door lock multiple times while the system is in the alarm state, and wherein the code is configured to expire, and thereby become ineffective to cause operation of the door lock, in response to the alarm state being cleared.

2. The method of claim 1, further comprising in response to receipt of the electronic signal, placing the system in an unarmed state.

3. The method of claim 1, wherein the system enters the alarm state in response to one or more of: detection of movement, detection of opening of a window, detection of opening of a second door that is different from the door, detection of forced entry into a building, detection of sound, detection of breakage of glass, detection of people in or around a building, detection of fire or smoke, detection of a low temperature or water, or detection of a medical emergency.

4. The method of claim 3, wherein the another component generates the code in response to detection of the medical emergency or detection of fire or smoke.

5. The method of claim 1, wherein the code is configured to expire, and thereby become ineffective to cause operation of the door lock, in response to a given period of time elapsing.

6. The method of claim 1, wherein receiving, by the door lock, the electronic signal includes receiving the electronic signal from first responder personnel.

7. The method of claim 1, wherein the code is sent by the system to first responder personnel.

8. The method of claim 1, wherein the code is sent by a lock server to first responder personnel, the lock server being in communication with the door lock.

9. The method of claim 1, wherein the code is sent by a monitoring server to first responder personnel, the monitoring server being in communication with the system and performing actions in response to conditions reported by the system to the monitoring server.

10. The method of claim 1, wherein the electronic signal including the code is unable to initiate operation of the door lock when the system is in a second alarm state different from the alarm state.

11. The method of claim 10, wherein the system enters the second alarm state in response to detection of one or more of alarm conditions including detection of movement, detection of opening of a window, detection of opening of a second door that is different from the door, detection of sound, detection of breakage of glass, detection of people in or around a building, or and detection of a low temperature or water.

12. A door lock comprising:

a latch mechanism; and a processor configured to receive a communication that includes a code, the code being generated by another component of a system that includes the door lock in response to the system entering an alarm state, wherein the communication is received by the door lock after the system enters the alarm state;

after the door lock receives the communication, receive an electronic signal to cause operation of the latch mechanism to permit movement of a door from a closed position to an open position, the electronic signal including the code; and cause operation of the latch mechanism in response to receipt of the electronic signal, wherein the code is usable to cause operation of the latch mechanism multiple times while the system is in the alarm state, and wherein the code is configured to expire, and thereby become ineffective to cause operation of the latch mechanism, in response to the alarm state being cleared.

13. The door lock of claim 12, wherein the processor is configured to receive the communication including the code from a lock server in communication with the door lock.

14. The door lock of claim 12, wherein the processor is configured to receive the communication including the code from a monitoring server configured to send the code to first responder personnel, the monitoring server configured to perform actions in response to conditions reported to the monitoring server by the system.

15. The door lock of claim 12, wherein the door lock is configured to remain engaged and lock the door in the closed position in response to receiving the electronic signal including the code while the system is in a second state of alarm that is different from the alarm state.

16. The door lock of claim 12, wherein the door lock is configured to receive the electronic signal from first responder personnel.

17. A system including:

a door lock associated with a door of a building, the door lock arranged to engage to lock the door in a closed position and to disengage to permit movement of the door from the closed position to an open position; and a component configured to receive user input that defines a set of one or more authorized alarm states that enable use of a code that authorizes disengagement of the door lock, receive an alarm signal indicating that the system has entered a detected alarm state, make a determination that the detected alarm state is included in the set of one or more authorized alarm states, and after making the determination, generate and send the code to the door lock, the code being generated after receiving the alarm signal indicating that the system has entered the detected alarm state;

wherein the door lock is configured to disengage to permit movement of the door to the open position in response to receipt of an electronic signal to cause operation of the door lock to permit movement of the door from the closed position to the open position, the electronic signal including the code; and wherein the component is configured to send the code to the door lock in a communication that occurs separately from receipt of the electronic signal by the door lock.

18. The method of claim 17, wherein the set of one or more authorized alarm states that enable use of the code includes an alarm state indicated by one or more of detection of fire or smoke at the building, detection of movement within the building, detection of an open window of the building, detection of sound within the building, detection of glass breakage at the building, or detection of a person in the building.

19. The method of claim 17, wherein the set of one or more authorized alarm states that enable use of the code excludes an alarm state indicated by one or more of detection of a low temperature at the building, detection of water at the building, or detection of unauthorized movement of a person outside the building.

* * * * *